United States Patent [19]
Baba

[11] Patent Number: 5,459,532
[45] Date of Patent: *Oct. 17, 1995

[54] AUTOMATIC FOCUS ADJUSTER FOR PROJECTION DISPLAY SYSTEMS HAVING FOCUS ADJUSTMENT DISPLAY SYMBOLS

[75] Inventor: Hiroyuki Baba, Suwa, Japan

[73] Assignee: Seiko Epson Corporation, Japan

[*] Notice: The portion of the term of this patent subsequent to Aug. 23, 2011, has been disclaimed.

[21] Appl. No.: 293,008

[22] Filed: Aug. 19, 1994

Related U.S. Application Data

[63] Continuation of Ser. No. 971,861, Mar. 29, 1993, Pat. No. 5,341,176.

[51] Int. Cl.$^6$ ................................ H04N 5/74; H04N 9/31
[52] U.S. Cl. ......................... 348/745; 348/345; 348/806
[58] Field of Search ..................... 348/445, 805, 348/345, 569, 806; H04N 5/74, 9/37

[56] References Cited

U.S. PATENT DOCUMENTS

| | | |
|---|---|---|
| 4,150,887 | 4/1979 | Huber . |
| 4,283,658 | 8/1981 | Parker . |
| 4,739,396 | 4/1988 | Hyatt . |
| 4,763,044 | 8/1988 | Nuckolis et al. . |
| 4,907,873 | 3/1990 | Kuriyama . |
| 4,925,295 | 5/1990 | Ogawa et al. . |
| 4,941,036 | 7/1990 | Itoh . |
| 4,951,131 | 8/1990 | Lindahl . |
| 4,964,719 | 10/1990 | Tachikawa et al. . |
| 4,988,187 | 1/1991 | Kuriyama . |
| 5,136,397 | 4/1992 | Miyashita . |

FOREIGN PATENT DOCUMENTS

| | | |
|---|---|---|
| 131794 | 1/1985 | European Pat. Off. . |
| 0192023 | 8/1986 | European Pat. Off. . |
| 0239024 | 9/1987 | European Pat. Off. . |
| 454451 | 10/1991 | European Pat. Off. . |
| 275615 | 12/1961 | Japan . |
| 22189 | 6/1974 | Japan . |
| 6046 | 3/1978 | Japan . |
| 39032 | 3/1982 | Japan . |
| 104918 | 6/1982 | Japan . |
| 97123 | 6/1984 | Japan . |
| 128314 | 8/1985 | Japan . |
| 247631 | 12/1985 | Japan . |
| 67012 | 4/1986 | Japan . |
| 61-154377 | 7/1986 | Japan . |
| 240108 | 10/1986 | Japan . |
| 261710 | 11/1986 | Japan . |
| 214828 | 8/1989 | Japan . |
| 204010 | 8/1989 | Japan . |
| 90135 | 3/1990 | Japan . |
| 3261284 | 11/1991 | Japan . |
| 4-10785 | 1/1992 | Japan . |
| 470076 | 3/1992 | Japan . |
| 4124980 | 4/1992 | Japan ............................. H04N 5/74 |
| 2259828 | 3/1993 | United Kingdom ............. H04N 5/74 |
| WO8906417 | 7/1989 | WIPO . |

OTHER PUBLICATIONS

Kohzai et al, "Liquid Crystal Color Video Projector", International Television Engineering Journal (ITEJ), Technical Report, vol. 13, No. 53, pp. 49–54 (Oct. 27, 1989).
U.S. Reissue application Ser. No. 08/284,952 filed Aug. 2, 1994 (re: U.S. Pat. No. 5,136,397).

*Primary Examiner*—James J. Groody
*Assistant Examiner*—Glenton B. Burgess

[57] ABSTRACT

A projection type display system having an optical modulation unit which modulates light from a light source in response to preselected video signal data, a projection lens system for projecting the modulated light onto a display screen, and a focal adjustment device which is configured to alter the focal state of a resulting image which is focused onto the screen. The focal state is adjusted by translating the relative position of one or more lenses in the projection lens system with respect to the screen. The focal adjustment device further incorporates a range finding unit which determines the distance between the projection lens system and the targeted display screen, typically using a beam of invisible light, and an automatic adjustment element which adjusts the focal point of the projection lens system to optimally match the determined distance.

9 Claims, 4 Drawing Sheets

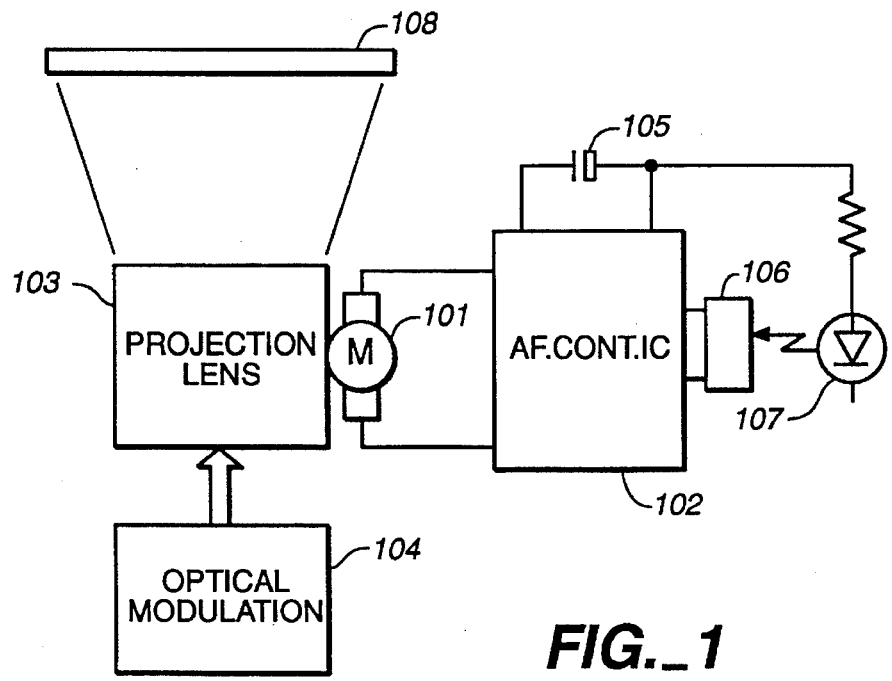
FIG._1
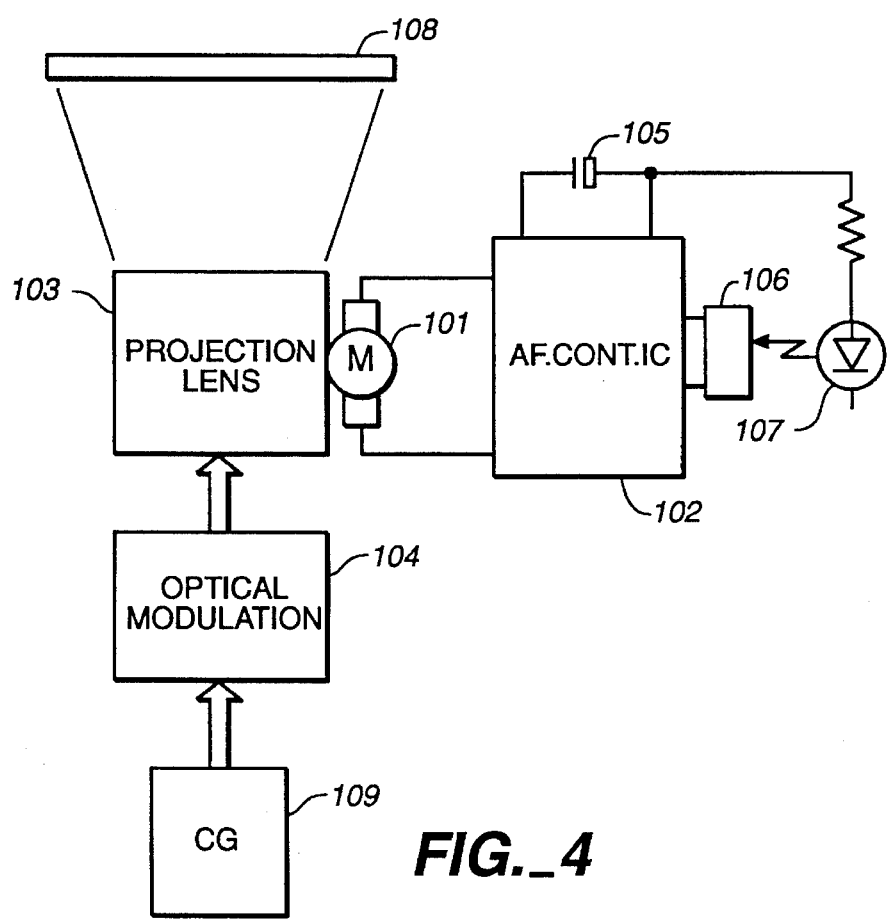
FIG._4

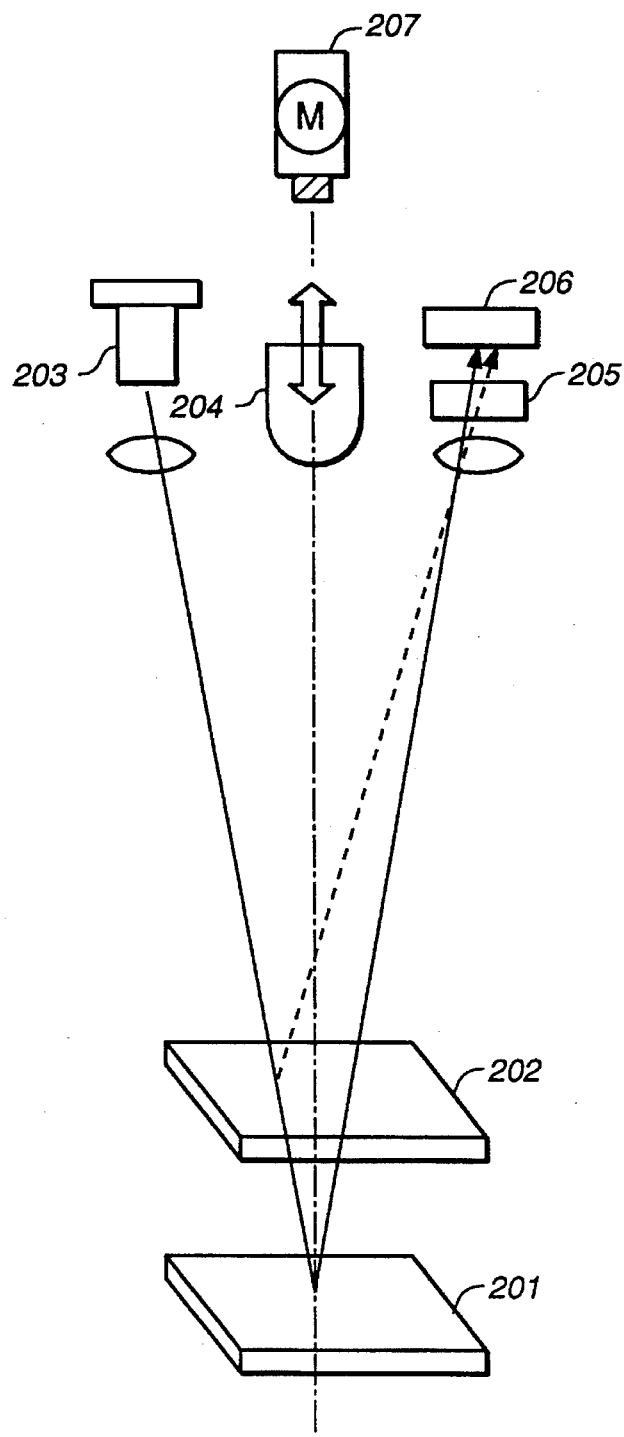
FIG._2
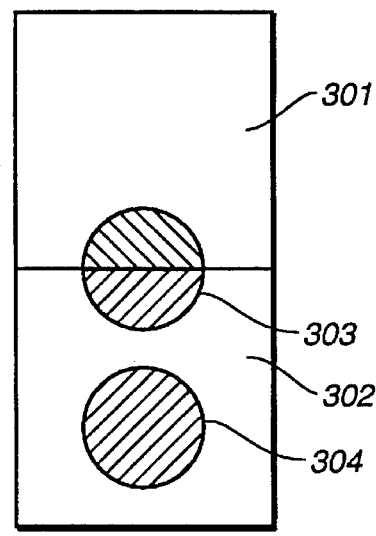
FIG._3

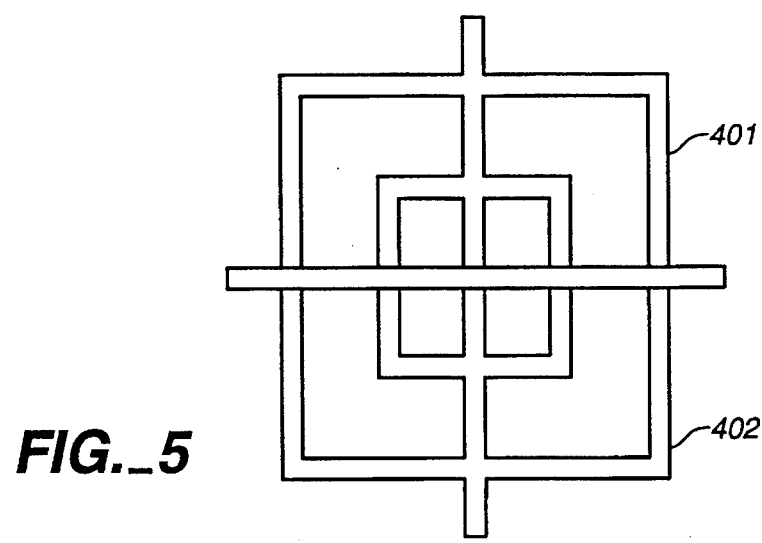
FIG._5
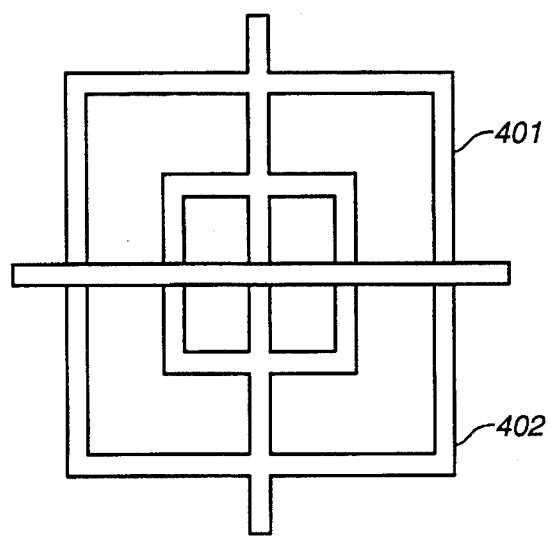
FIG._7A
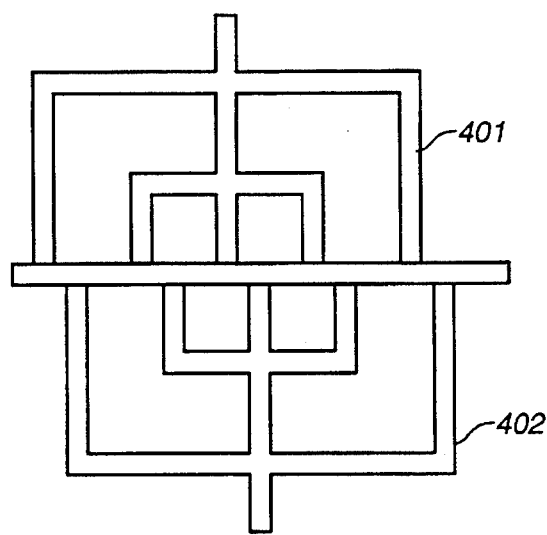
FIG._7B

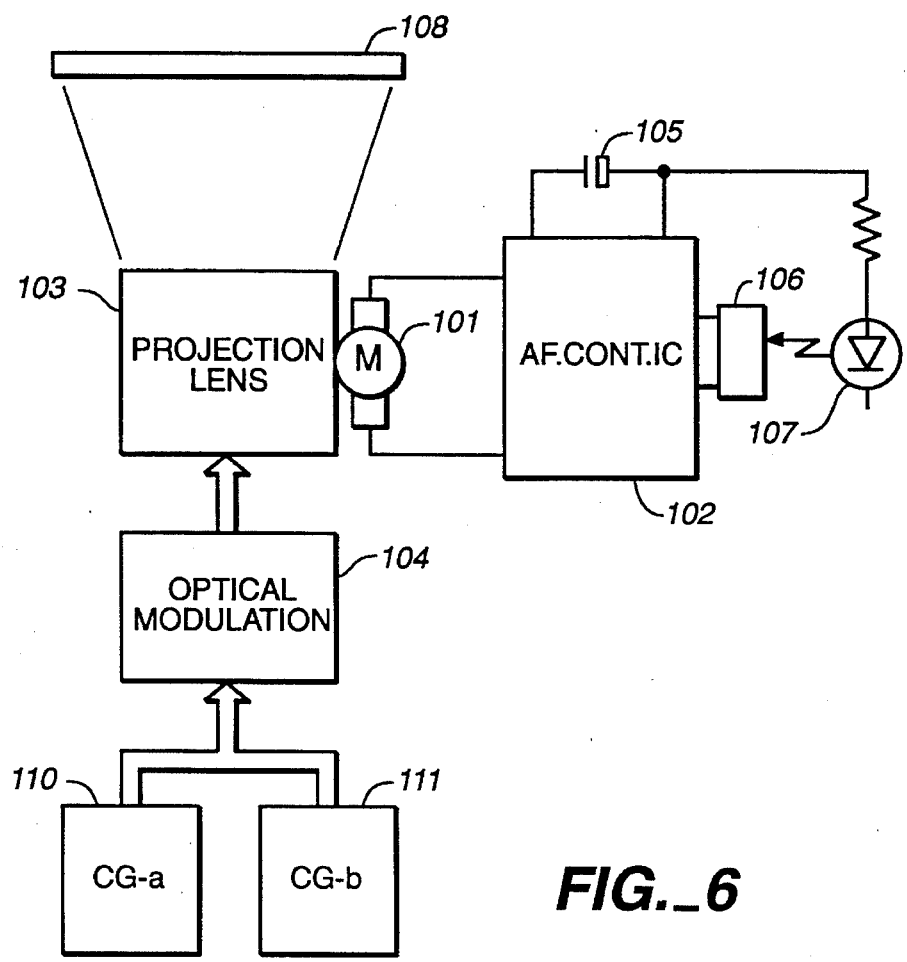
FIG._6
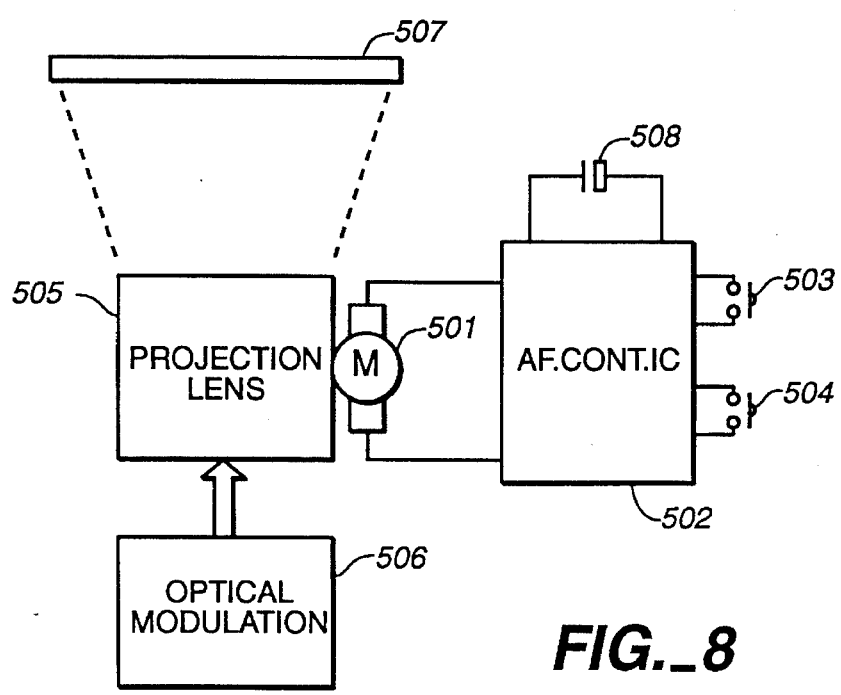
FIG._8

AUTOMATIC FOCUS ADJUSTER FOR PROJECTION DISPLAY SYSTEMS HAVING FOCUS ADJUSTMENT DISPLAY SYMBOLS

CROSS REFERENCE TO RELATED APPLICATION

This is a continuation of U.S. patent application Ser. No. 07/971,861, filed Mar. 29, 1993, now U.S. Pat. No. 5,341,176, issued Aug. 23, 1994.

BACKGROUND OF THE INVENTION

1. Field of the Invention

The present invention relates to projection type display systems for use in projecting an enlarged image onto a display screen through a projection lens which is obtained by modulating a liquid crystal panel in accordance with video data. The present invention further relates to a small-sized, highly portable, projection type display system using a liquid crystal panel as a light modulator.

2. Related Technical Art

In a typical small-size, highly portable, projection type display system (e.g., a projection type display system using a liquid crystal panel as an optical modulator), the projection lens has its focal length adjusted either manually by using mechanical means or automatically by using an electric motor operated by a switch. This is done because the distance between the projection type display system and an associated display screen changes each time the display system location or position changes.

The focal length adjustment process is specifically described below with reference to FIG. 8. FIG. 8 illustrates a diagram of the structure of a focusing mechanism which is useful for adjusting the focal point of a projection lens using an electric motor which is operated by a switch.

If a focus adjustment switch 504 is depressed or otherwise activated, pulses having a width proportional to the length of time the switch is depressed, are generated by a motor drive signal generator 502. As a result, a projection lens drive motor 501 is activated by this signal and moves or drives a projection lens 505 for a length of time corresponding to the pulse width so that the projection lens 505 is moved toward a screen 507 to change its focal length.

If, instead, a focus adjustment switch 503 is depressed or otherwise activated, projection lens 505 is driven, in the same manner as described above, away from screen 507 to change the focal length.

Using the operations as described thus far, focus adjustment switches 503 and 504 are operated in order to move projection lens 505 and alter the distance between projection lens 505 and screen 507 to a value equal to the focal length of projection lens 505. As a result, light modulated by an optical modulation block 506 in accordance with input video signals is clearly projected onto screen 507 on an enlarged scale by projection lens 505. In FIG. 8, reference numeral 508 designates a power supply for the motor drive signal generator 502.

Since the focal adjustment is accomplished by depressing or activating focal adjustment switches 503 and 504, according to this background art, the switches are continuously depressed while observing the imaged focused on screen 507, until the focus is adjusted to be in the vicinity of an optimum focal adjustment point. After this, the projection lens forward focal adjustment switch 504 or the backward focal adjustment switch 503 are also depressed several times while observing the on screen image until the optimum focal point is finally reached. This causes problems in operating the system because this requires depressing operation switches 503 and 504 several times until the optimum focal point is set.

If a projection system user with poor visibility or visual acuity is adjusting the focal point, current systems find it difficult to obtain the optimum focal point because the user has to observe or adequately perceive details of the image focused on screen 507 during adjustment. Other objects and attainments together with a fuller understanding of the invention will become apparent and appreciated by referring to the following description and claims taken in conjunction with the accompanying drawings.

SUMMARY OF THE INVENTION

The present invention was conceived in view of the problems thus far described, with one purpose being to facilitate adjustments to the focus of a projection type display system to thereby improve the setting precision for an optimum focal point.

In order to achieve this and other purposes, advantages and, objects, a projection type display system is provided which comprises: an optical modulator, such as a CRT or LCD panel for modulating a source of light in accordance with preselected video image signals or data; a projection lens system for projecting the modulated light onto a display screen; and a focal adjustment device connected to the projection lens system for adjusting the focal state of the resulting image focused onto the screen. The focal adjustment device includes a range measuring unit for measuring the distance between the projection lens system and the screen with an invisible beam of electromagnetic radiation such as infrared wavelength light, and automatic adjustment elements for adjusting the focal point of the projection lens system to an optimum focal point or position. Because an automatic focal adjustment device is provided, the optimum focal point can be set without difficulty to the system user by adjusting the focal point automatically each time the projection type display system is moved or repositioned. As a result, focal adjustment operations can be dramatically facilitated to improve the precision with which the optimum focal point is set.

If the projection type display system further comprises a pattern display unit which displays a fixed pattern when the automatic focal adjustment device stops performing focal adjustment, a user can easily confirm the moment when the operation of the automatic focal adjustment device terminates so as to improve the operability of the focal adjustment mechanism or process.

If, moreover, the above pattern display unit is one that displays a first fixed pattern while the automatic focal adjustment device is undergoing focal adjustment operations, and a second fixed pattern when focal adjustment has ended and the automatic focal adjustment device is not in operation, focal adjustment operability is further improved because the user is able to easily confirm operation of the automatic focal adjustment device by virtue of different fixed patterns being displayed during and at the end of operation for the automatic focal adjustment device.

BRIEF DESCRIPTION OF THE DRAWINGS

FIG. 1 is a block diagram a first embodiment of a projection type display constructed according to the principles of the present invention;

FIG. 2 illustrates an automatic focal adjustment as applied to the projection type display system of FIG. 1.

FIG. 3 illustrates an infrared beam reception unit as applied to the projection type display system of FIG. 1;

FIG. 4 illustrates a second embodiment of a projection type display system according to the present invention;

FIG. 5 is a diagram of a focal adjustment fixed pattern to be applied to the projection type display system of FIG. 4;

FIG. 6 is a block diagram of a third embodiment of a projection type display system constructed according to the principles of the present invention;

FIGS. 7A and 7B are diagrams showing two kinds of focal adjustment fixed patterns useful in the projection type display system of FIG. 6; and FIG. 8 is a block diagram of a projection type display system according to the background art of the present invention.

DETAILED DESCRIPTION OF PREFERRED EMBODIMENTS

Embodiments of the present invention are described below with reference to FIGS. 1 to 7. Additionally, the same components in the figures are designated using identical reference characters, and any overlap in component description is omitted.

First, a first embodiment of a projection type display system constructed and operating according to the present invention is described with reference to FIGS. 1 through 3. In this embodiment, an automatic focal adjustment mechanism is constructed which adjusts the focal length of a projection lens after determining the separation distance between a projection lens and a display or projection screen, onto which an image is to be projected, using an infrared beam. More specifically, the separation distance between a projection lens 103 and a screen 108 is determined by emitting an infrared beam from an infrared beam emission unit or source 107, and by receiving reflected portions of the emitted infrared beam using an infrared beam wavelength receiver or reception unit 106. In accordance with the measured distance, a drive or activation signal is output by an auto-focus control type integrated circuit (AF.CONT.IC) 102 which drives a focal adjustment motor 101. In response to the drive signal, projection lens 103 is moved or translated either forward or backward with respect to screen 108 so as to effect an automatic adjustment of the distance between the projection lens system and screen so that their relative separation may be made equal to the focal length of the projection lens system. As a result, light is modulated in an optical modulation block 104 in accordance with video data, and then projected on an enlarged scale by projection lens 103 so that it is clearly focused on screen 108. AF.CONT.IC 102 is connected to a power supply 105 to supply it with a drive voltage which is used to power motor 101.

The principles of operation for the automatic adjustment mechanism as applied by the present invention are described next with reference to FIGS. 2 and 3. An infrared beam emitted from an infrared beam emission unit 203 is reflected from the surface of a screen 201 or a screen 202. Here, display screen 201 is located where the focal point is optimally adjusted, whereas display screen 202 is located in an out of focus position. Infrared beams thus reflected by display screens 201 and 202 are deflected by a parallel prism 205 so that they are received or sensed by an infrared beam reception unit 206. A drive signal for activating a focal adjustment motor 207 is generated in accordance with the relative spot positions of the infrared beam received on infrared beam reception unit 206.

Infrared beam reception unit 206 is divided, as shown in FIG. 3, into two areas or reception regions, i.e., an area 301 and an area 302. If the focal length is automatically adjusted to the optimum position, the infrared beam spot extends evenly over areas 301 and 302, and is located at a spot position 303. On the other hand, if the lens-screen system is out of focus, the infrared beam spot position is offset into area 301 or area 302, as indicated by a spot position 304.

The reception unit itself is composed of a photo-electric conversion element or the like so that it generates an electric signal in proportion to the level or amplitude of the received infrared beam or radiation. As a result, AF.CONT.IC 102 can generate a drive signal for focus adjustment motor 207 on the basis of the infrared beam radiation received by the infrared beam reception unit. For example, a focus adjustment motor drive signal is generated and provided to motor 207 to move projection lens 204 forward, if the beam is received in area 302. Thus, the infrared beam spot extends evenly, as indicated at spot position 303, over area 301 and area 302 so that the focus is automatically adjusted by moving or translating projection lens 204 forward or backward until an optimum focal point is achieved by balancing the focal adjustment motor drive signal for moving projection lens 204 forward and the focal adjustment motor drive signal for moving projection lens 204 backward.

Therefore, as projection lens 204 is translated back and forth, or otherwise displaced relative to the screen, by focus adjustment motor 207 so that its focal length is automatically adjusted to optimize the relation between the screen and projection lens system as in the case of screen 201 residing at an optimum focal point for the lens system.

A second embodiment of a projection type display system constructed according to the present invention is described next in reference to FIGS. 4 and 5. In this embodiment, a character generator or a type of pattern display unit capable of displaying one kind of fixed pattern is used in addition to the structure illustrated for the first embodiment so that a system user can visually confirm a termination in the operation of the auto-focus adjustment mechanism. The infrared beam is emitted from infrared beam generator or emission unit 107 and is received by an infrared beam reception unit 106. Consequently, the distance between projection lens 103 and screen 108 is measured, and a drive signal for focus adjustment motor 101 is generated by AF.CONT.IC 102 in accordance with this measured distance. Again, AF.CONT.IC 102 is connected to power supply 105 to supply the drive voltage for operating the lens motor.

A drive signal is generated by AF.CONT.IC 102 so that focus adjustment motor 101 is driven to move projection lens 103 forward or backward. As a result of forward or backward movement of projection lens 103, auto-focusing is effected such that the distance between projection lens 103 and screen 108 may be made equal to the focal length of projection lens 103. The principle of this automatic adjustment process has been described above. Therefore, light that has been modulated in optical modulation block 104 in accordance with the video data is projected on an enlarged scale by projection lens 103 and focused on screen 108. Moreover, a character or symbol generator (i.e., CG) 109 generates one kind of fixed pattern (as shown in FIG. 5), which is superimposed on the video data and displayed on screen 108.

A third embodiment of a projection type display system constructed and operating according to the present invention is described next with reference to FIGS. 6 and 7. Here the adjustment device is equipped, in addition to the structure of the first embodiment, with a character generator or a pattern type display unit capable of displaying two kinds of fixed patterns so that a user can visually confirm both in-operation and end-of-operation states of the auto-focusing mechanism.

The distance between projection lens 103 and screen 108 is again measured by emitting a beam of infrared wavelength radiation from infrared beam emission unit 107 and by receiving it, or reflected portions thereof, at infrared beam receiving unit 106. In accordance with the measured distance, AF.CONT.IC 102 generates the drive signal to drive focal adjustment motor 101. Since projection lens 103 is moved forward or backward by focal adjustment motor 101, the distance between projection lens 103 and screen 108 is automatically adjusted so that it is made equal to the focal length of projection lens 103. As a result, the light modulated in optical modulation block 104, in accordance with the video data, is projected on an enlarged scale by projection lens 103 and is projected onto screen 108. In FIG. 6, reference labels or component designators CG-a 110 and CG-b 111 designate two character generators, of which CG-a 110 generates a fixed pattern indicating that the auto-focusing mechanism is in operation whereas the CG-b 111 generates a fixed pattern indicating that the auto-focusing mechanism has ended its operation. The fixed pattern data used to control image projection generated by the individual character generators are superimposed on the video data used to control image projection in optical modulation block 104 and are displayed on screen 108. The switching of the outputs of character generators CG-a 110 and CG-b 111 is accomplished in response to signals which are generated by AF.CONT.IC 102 for the different operations of the automatic adjustment mechanism.

FIG. 7A represents a fixed pattern which is output from generator CG-a 110 to indicate that the auto-focusing mechanism is in operation, and FIG. 7B represents a fixed pattern which is output from generator CG-b 111 to indicate that the auto-focusing mechanism has ended its operation. In the present embodiment, a pattern composed of offset upper 401 and lower 402 components is displayed on screen 108, as shown in FIG. 7A, while the auto-focusing mechanism is in operation (because of being out of focus). When operation of the auto-focusing mechanism ends, on the other hand, a pattern having a complete shape, with upper 401 and lower 402 components aligned, is displayed on screen 108, as shown in FIG. 7B.

As has been described above, according to the present invention, the focal adjustment process can be greatly simplified so that the optimum focal point is set automatically by providing the projection type display system with an auto-focusing mechanism, so that the precision of focal adjustment is also greatly improved. This is especially true in the case of small-size, highly portable, projection type display systems using liquid crystal panels as optical modulation elements, where focal adjustment elements occupy a large percent of the display unit weight. By adopting the structure of the present invention, the operability and precision of focal adjustment are remarkably improved and the liquid crystal projection type display system features small size and high portability.

In the case of a fixed focal indication pattern, moreover, a display system user is able to easily know the focal state of an image on the display screen by display of a pattern indicating the end of auto-focusing mechanism operation. In the alternative, by displaying two different kinds of fixed patterns for indicating either that the auto-focusing mechanism is in operation or has ended its operation, the user is easily able to know the operational state of the auto-focusing mechanism from not only the focal state of the image projected onto the screen but also from the kind of fixed pattern being displayed.

While this invention has been described in conjunction with several specific embodiments, it is evident to those skilled in the art that many further alternatives, modifications and variations will be apparent in light of the foregoing description. Thus, the invention described herein is intended to embrace all such alternatives, modifications, applications and variations as may fall within the spirit and scope of the appended claims.

What is claimed is:

1. A projection type display system comprising:
   a) optical modulation means for modulating a light in accordance with video data;
   b) a projection lens system having a projection lens for projecting the modulated light on a screen;
   c) automatic adjustment means for focusing images onto the screen;
   d) a range finding unit for finding the distance between said projection lens and said screen with a beam of light, said range finding unit comprising
      (i) a light emitting element for irradiating said screen with said beam of light, and
      (ii) a light reception device for receiving light reflected from said screen to output an electrical signal corresponding to the light receiving position of said reflected light;
   e) a control means, coupled to said automatic adjustment means and to said range finding unit, for sending a control signal to said automatic adjustment means so that said reflected light may irradiate a desired light receiving position in said light receiving device on the basis of said electrical signal; and
   f) a pattern display unit, coupled to said optical modulation means, for displaying on said screen a first fixed pattern during a focal adjustment period, and a second fixed pattern when focal adjustment is completed.

2. The system of claim 1, wherein said pattern display unit comprises a plurality of character generators.

3. The system of claim 1, wherein said first and second fixed patterns are displayed as a pattern having an upper component and a lower component.

4. The system of claim 3, wherein said first fixed pattern comprises said upper and lower components laterally offset from each other.

5. The system of claim 4, wherein said second fixed pattern comprises said upper and lower components displayed without lateral offset.

6. The system of claim 1 wherein said light reception device has at least two light receiving areas, reflected light in one area causing the automatic adjustment means to operate in one mode, with light in the other light receiving area causing the automatic adjustment means to operate in an opposite mode.

7. The system of claim 1 wherein said pattern display unit superimposes the first or second pattern onto said video data.

8. The system of claim 1 wherein said beam of light is infrared radiation.

9. The system of claim 1 wherein said automatic adjustment means comprises means for changing the distance from said screen to said projection lens.

* * * * *